Oct. 20, 1931.  A. E. SHAW  1,828,625
GLOBE HOLDER
Filed April 25, 1931
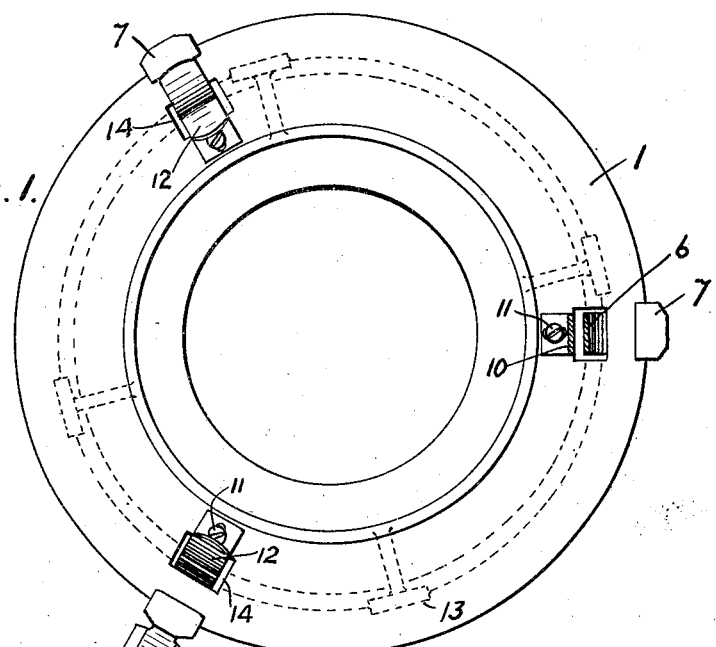
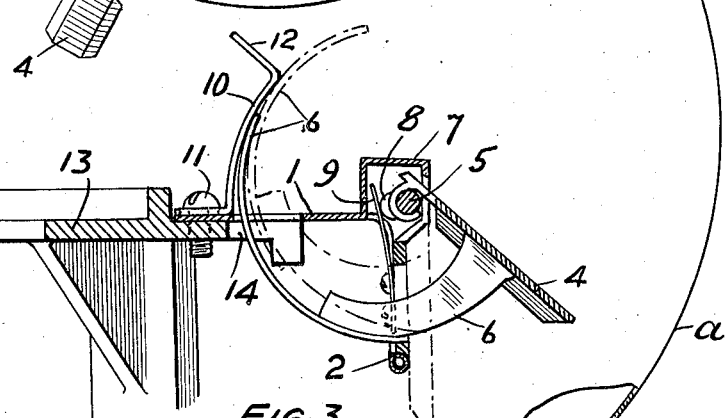
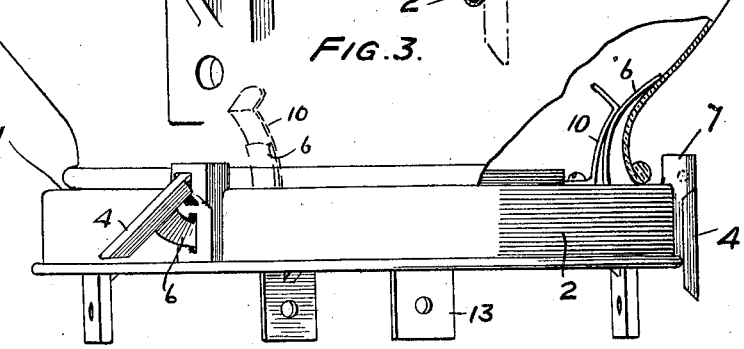
WITNESS:
INVENTOR
Arthur E. Shaw
BY
Augustus B. Stoughton.
ATTORNEY.

Patented Oct. 20, 1931

1,828,625

UNITED STATES PATENT OFFICE

ARTHUR E. SHAW, OF PHILADELPHIA, PENNSYLVANIA, ASSIGNOR TO PENNSYLVANIA GLOBE COMPANY, OF PHILADELPHIA, PENNSYLVANIA, A CORPORATION OF PENNSYLVANIA

GLOBE HOLDER

Application filed April 25, 1931. Serial No. 532,834.

Objects of the present invention are to improve globe holders of the kind that are usually employed in street lighting for holding globes which are expensive, are subjected to considerable wind pressure, and are to be held firmly yet without being subjected to undue pressure or strain; to permit of the convenient mounting and dismounting of a globe without requiring the use of both hands of the operator at the same time which is a matter of convenience especially in cases where the globe is at the top of a post and the operator is required to stand upon a ladder or the like; to simplify the construction and arrangement of the parts; and to properly and satisfactorily reinforce the fingers by means of which the globe is held and retained on the base.

Other objects of the invention will appear from the following description at the end of which the invention will be claimed.

Generally stated, the invention comprises a base having openings therein, finger pieces pivoted to the base and having curved fingers arranged for operation through the openings in the base for movement into globe holding and globe releasing positions, and shoes projecting upward from the base and upon which a curved portion of the fingers bears and slides.

The invention also comprises the improvements to be presently described and finally claimed.

In the folllowing description reference will be made to the accompanying drawings forming part hereof and in which Figure 1 is a top or plan view of a holder embodying features of the invention and showing at the right a finger and shoe in cross section.

Fig. 2 is an elevational view showing parts broken away, and

Fig. 3 is a view drawn to an enlarged scale and it is principally in section.

Referring to the drawings, 1 is a base shown as circular in plan and as flanged at 2. The base is provided with openings 3 of which three are shown as arranged between the inner and outer rims of the base. 4 represents finger pieces pivoted at 5 near the rim of the base, and they are provided with curved finger pieces 6 that extend through the openings 3 in the base. As shown the pivots for the finger pieces 4 are arranged in housings 7 provided on the base. The finger pieces are provided with cam faces 8 upon which press springs 9 arranged inside of the flange 2. The finger pieces and fingers are provided two positions of rest by the cam faces 8 and springs 9. In one position, shown in full lines in Fig. 3, the finger pieces project outward from the flange 2 and the fingers are retracted, and in the other position, as shown in that figure in dotted lines, the finger pieces 4 rest upon the flange 2, and the fingers are projected. 10 represents shoes projecting upward from the base 1, and they are curved and are arranged in sliding contact with the fingers 6. As shown the shoes 10 are connected with the base by screws 11. By proviidng slots in the feet of the shoes for the passage of the screws 11 an adjustment is provided by which, if desired, the tension of the shoes in respect to the fingers 6 can be increased or diminished. The fingers 6 and the shoes 10 may be made of resilient material and it is a function of the shoes to reinforce and strengthen the fingers 6. The free end of the shoes may be bent or offset, as at 12, which is of some assistance in placing the neck of a globe $a$ on the support and outside of the fingers 6 when in retracted position. The pedestal 13 is a convenient means for attaching or supporting the base at the top of the post and it may be notched as at 14 for the accommodation of the fingers 6. As shown the screws 11 are employed for fastening the pedestal and base. It may be remarked that the fingers 6 extend through openings in the flange 2 and then the housings 7 are provided with openings for the accommodation of the shanks of the finger pieces.

To mount a globe on the holder, the finger pieces 4 are turned outward into the position shown in full lines, Fig. 3, thus retracting the fingers to a position in which their ends are below the ends of the shoes 10. The finger pieces can be operated successively by one hand, if desired. The globe is then placed on the base 1 and the shoes 10 may serve as a rough centering guide in that operation. Then the finger pieces are pushed inward, as shown in dotted lines in Fig. 3, so that the fingers thus reinforced or supported by the shoes 10, are projected in the proper position for holding the globe from the inside thereof as shown in Fig. 2.

It may be remarked that the shoes 10 and the ends of the fingers 6 cooperate or may cooperate to provide sufficient rigidity for holding the globe combined with some resiliency which serves to prevent the imposition of undue strain or pressure on the globe.

It will be obvious to those skilled in the art to which the invention relates that modifications may be made in details of construction and arrangement and matters of mere form without departing from the spirit of the invention which is not limited to such matters of otherwise than the prior art and the appended claims may require.

I claim:

1. A globe holder comprising, in combination, a base having spaced openings, finger pieces pivoted to the base and provided with curved fingers movable through said openings, and shoes projecting from the base and arranged for contact with the curved fingers.

2. A globe holder comprising, in combination, a base provided with openings, spring pressed finger pieces pivoted to the base and provided with curved fingers movable through said openings, and shoes projecting from the base and arranged for contact with the curved fingers.

3. A globe holder comprising, in combination, a flanged base, housings arranged at the union of the flange and base, finger pieces pivotally mounted in the housings and provided with fingers extending through openings provided in the flange and in the base, and shoes mounted on the base and arranged for contact with the fingers.

4. In a globe holder, the combination of pivotally mounted curved globe holding fingers of resilient material adapted for projection and retraction, and relatively fixed shoes of resilient material arranged in the path of said fingers and terminating short of the ends of the fingers when in projected position.

ARTHUR E. SHAW.